United States Patent
Ramaley

(10) Patent No.: US 10,009,642 B2
(45) Date of Patent: Jun. 26, 2018

(54) SYSTEMS AND METHODS FOR ADVERTISING CONTINUITY

(71) Applicant: thePlatform, LLC, Seattle, WA (US)

(72) Inventor: Alan Ramaley, Seattle, WA (US)

(73) Assignee: COMCAST CABLE COMMUNICATIONS MANAGEMENT, LLC, Philadelphia, PA (US)

( * ) Notice: Subject to any disclaimer, the term of this patent is extended or adjusted under 35 U.S.C. 154(b) by 0 days. days.

(21) Appl. No.: 15/079,831

(22) Filed: Mar. 24, 2016

(65) Prior Publication Data

US 2017/0280181 A1    Sep. 28, 2017

(51) Int. Cl.
| | |
|---|---|
| *H04N 7/025* | (2006.01) |
| *H04N 21/2662* | (2011.01) |
| *H04L 29/06* | (2006.01) |
| *H04N 21/258* | (2011.01) |
| *H04N 21/81* | (2011.01) |

(Continued)

(52) U.S. Cl.
CPC ..... *H04N 21/2662* (2013.01); *H04L 65/4084* (2013.01); *H04L 65/601* (2013.01); *H04N 21/25825* (2013.01); *H04N 21/6373* (2013.01); *H04N 21/64322* (2013.01); *H04N 21/812* (2013.01)

(58) Field of Classification Search
CPC ......... H04N 21/23424; H04N 21/2343; H04N 21/2358
See application file for complete search history.

(56) References Cited

U.S. PATENT DOCUMENTS 8,856,825 B1 * 10/2014 Mick, Jr. ............. H04N 21/812
                                                                        725/32
9,066,115 B1 *  6/2015 Cherry ............. H04N 21/23424
(Continued)

FOREIGN PATENT DOCUMENTS

| CA | 2962029 | 3/2017 |
|---|---|---|
| EP | 17162798.7 | 3/2017 |

OTHER PUBLICATIONS

Extended European Search Report was dated Jul. 5, 2017 by the European Patent Office for EP Application No. 17162798.7, which was filed on Mar. 24, 2017 (Applicant—thePlatform, LLC) (7 pages).

*Primary Examiner* — Pankaj Kumar
*Assistant Examiner* — Timothy Newlin
(74) *Attorney, Agent, or Firm* — Ballard Spahr LLP

(57) ABSTRACT

Methods and systems are described for generating content identification tiles, such as manifest files, for ensuring content and advertising continuity when changes occur during playback. A user device can request content at a particular bitrate, and a first manifest file comprising references to the content and selected associated content such as advertisements can be created in response to the request. While one of the advertisements is being displayed, the user device can request a change, such as for a different bitrate. A computing device, such as a manifest server can access the first manifest file to determine the content and the associated content, such the advertisements, that were intended for the user. The manifest server can then create a second manifest file in response to the request, where second manifest file can be created with the associated content, for example, the advertisements in the first manifest file.

20 Claims, 10 Drawing Sheets

(51) Int. Cl.
*H04N 21/643* (2011.01)
*H04N 21/6373* (2011.01)

(56) References Cited

U.S. PATENT DOCUMENTS

| | | | | |
|---|---|---|---|---|
| 9,066,138 | B1* | 6/2015 | Kraiman | H04N 21/458 |
| 9,578,395 | B1* | 2/2017 | Qureshi | H04N 21/8455 |
| 2006/0075449 | A1* | 4/2006 | Jagadeesan | G06Q 30/02 |
| | | | | 725/113 |
| 2009/0313652 | A1* | 12/2009 | Connery | H04N 21/23406 |
| | | | | 725/32 |
| 2010/0014594 | A1* | 1/2010 | Beheydt | H04N 21/23424 |
| | | | | 375/240.26 |
| 2010/0223392 | A1* | 9/2010 | Pond | H04N 21/23424 |
| | | | | 709/231 |
| 2010/0235468 | A1* | 9/2010 | Cobb | G06Q 30/02 |
| | | | | 709/218 |
| 2011/0246666 | A1 | 10/2011 | Aloni et al. | |
| 2011/0320287 | A1* | 12/2011 | Holt | G06Q 30/00 |
| | | | | 705/14.73 |
| 2012/0072286 | A1* | 3/2012 | Kilar | G06Q 30/02 |
| | | | | 705/14.55 |
| 2013/0064283 | A1* | 3/2013 | Sun | H04N 21/2343 |
| | | | | 375/240.01 |
| 2013/0091521 | A1* | 4/2013 | Phillips | H04N 21/23424 |
| | | | | 725/35 |
| 2013/0151994 | A1 | 6/2013 | Marcella et al. | |
| 2013/0159388 | A1* | 6/2013 | Forsman | H04N 21/64322 |
| | | | | 709/203 |
| 2013/0290556 | A1* | 10/2013 | Giladi | H04L 65/60 |
| | | | | 709/231 |
| 2013/0332971 | A1* | 12/2013 | Fisher | H04N 21/266 |
| | | | | 725/93 |
| 2014/0025836 | A1* | 1/2014 | Gupta | H04N 21/8456 |
| | | | | 709/231 |
| 2014/0230003 | A1* | 8/2014 | Ma | H04N 21/231 |
| | | | | 725/115 |
| 2014/0236739 | A1 | 8/2014 | MacTiernan et al. | |
| 2014/0280688 | A1 | 9/2014 | Mao et al. | |
| 2015/0067722 | A1* | 3/2015 | Bjordammen | H04N 21/2625 |
| | | | | 725/32 |
| 2015/0278884 | A1* | 10/2015 | Manzari | G06Q 30/02 |
| | | | | 705/14.73 |
| 2015/0295648 | A1* | 10/2015 | Mutalik | H04B 10/25751 |
| | | | | 725/131 |
| 2016/0065995 | A1 | 3/2016 | Phillips | |
| 2016/0182923 | A1* | 6/2016 | Higgs | H04H 20/106 |
| | | | | 725/34 |

\* cited by examiner

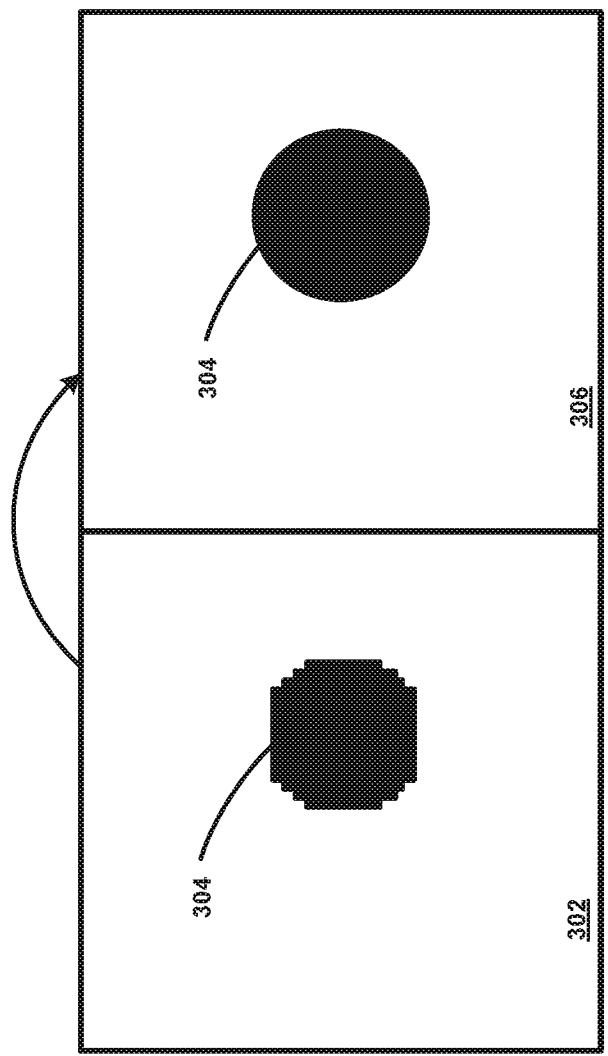

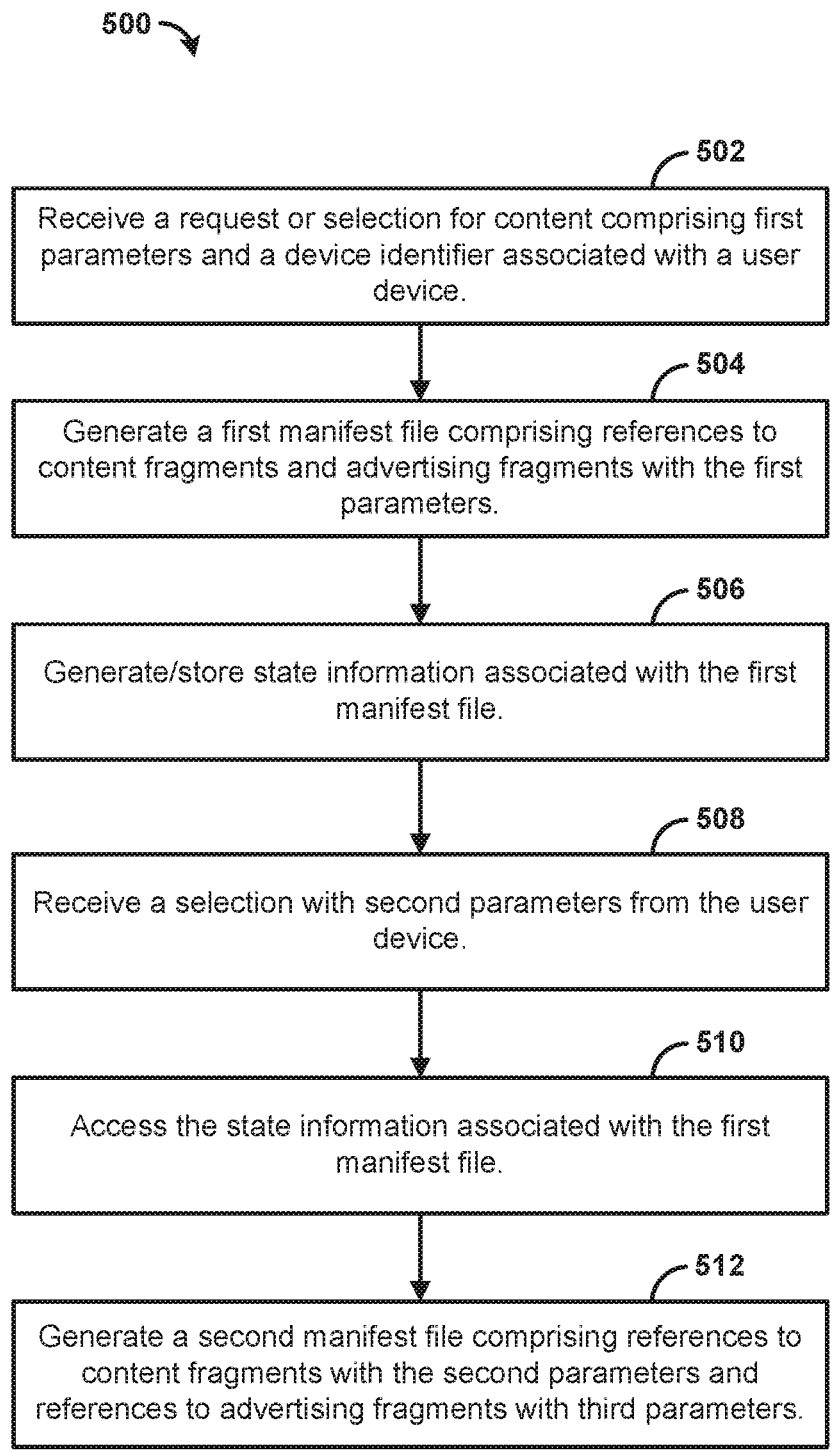

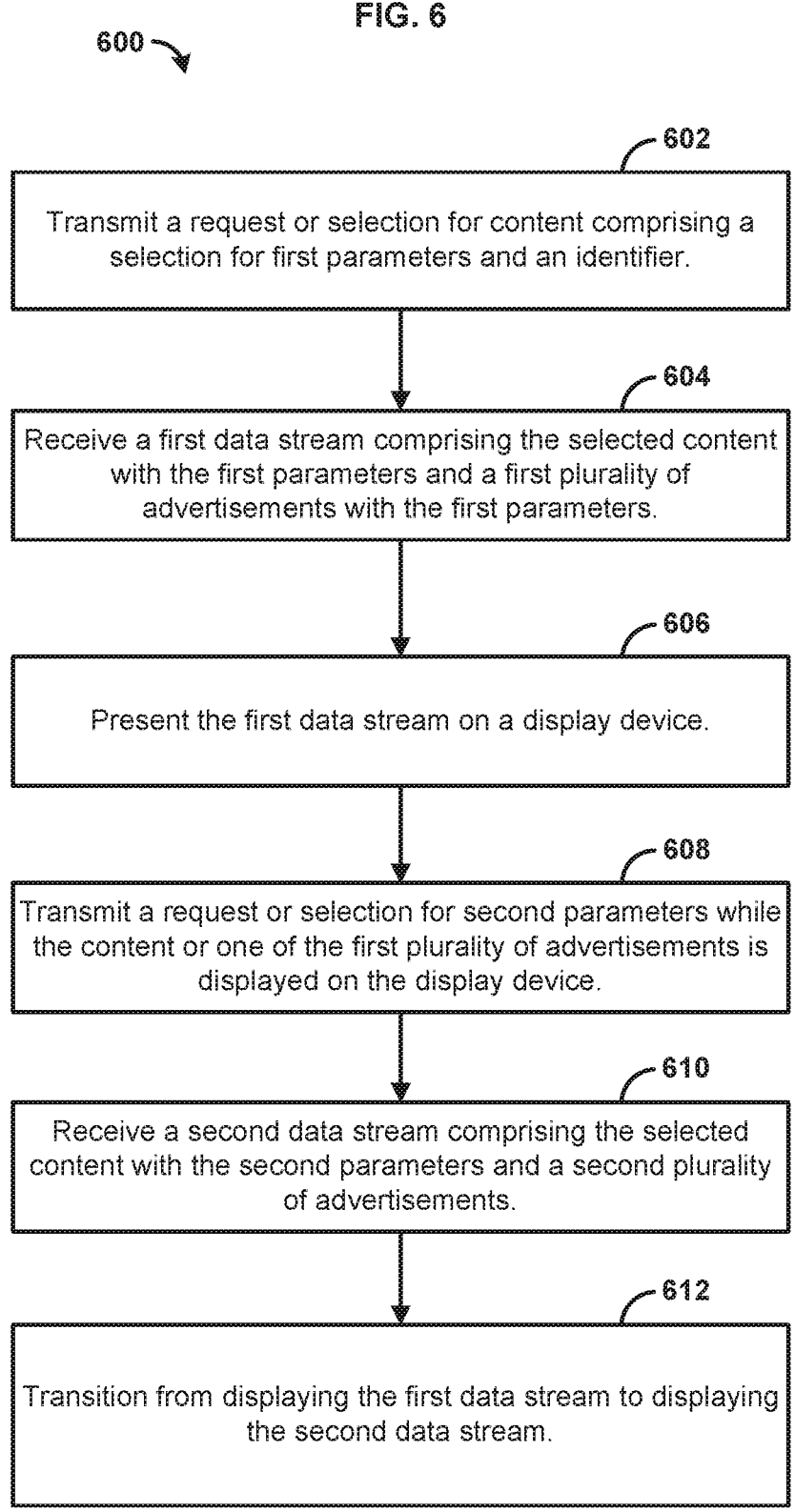

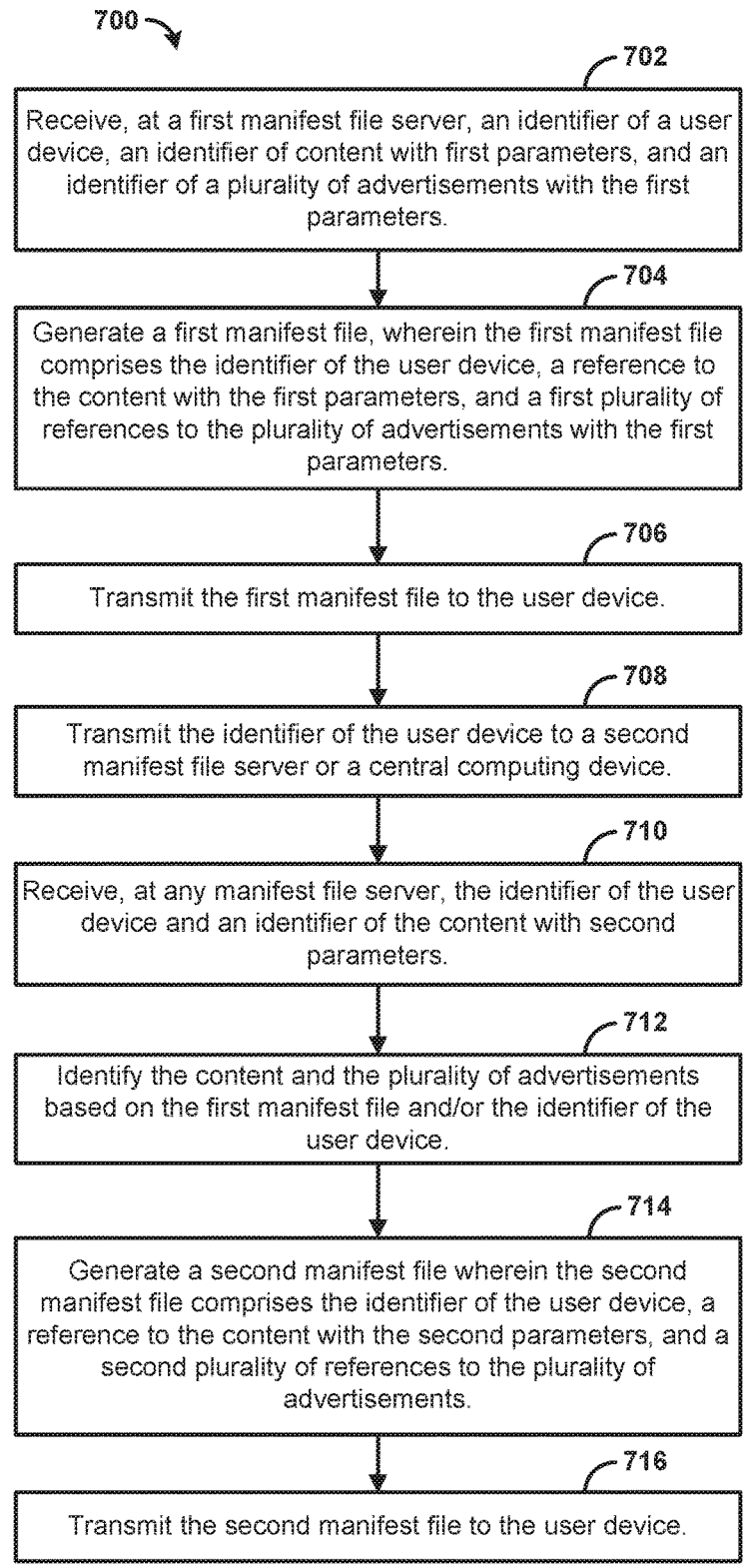

SYSTEMS AND METHODS FOR ADVERTISING CONTINUITY

BACKGROUND

Internet Protocol (IP) video can be delivered at different bitrates. A device receiving an IP video stream can request a change in the bitrate of the video stream. If the IP video stream is currently displaying an advertisement, a different advertisement, corresponding to the newly requested bitrate will interrupt the currently displaying advertisement at the old bitrate, causing a negative impact on the user experience. What is needed is a way to transition between bitrates mid-advertisement while maintaining continuity. These and other shortcomings are addressed by the present disclosure.

SUMMARY

It is to be understood that both the following general description and the following detailed description are exemplary and explanatory only and are not restrictive. Methods and systems are described for ensuring continuity with segments of content. For example, the methods and systems described herein can be used to ensure advertising continuity. In an aspect, a user device can request content at a first bitrate. The content request can comprise an identifier associated with the user device. In response to the content request, an advertisement server can generate an advertisement list and deliver the advertisement list to a manifest server. The advertisement list can comprise one or more advertisements that can be displayed during consumption of the requested content. The manifest server can transmit the advertisement list and the identifier associated with the user device to a central computing device. The manifest server can create a first manifest file comprising instructions for acquiring the requested content at the first bitrate and the advertisements in the advertisement list at the first bitrate. The first manifest file can be transmitted to the user device and the user device can use the first manifest file to acquire and playback sequential video fragments of the requested content and advertisements at the first bitrate. In an aspect, the user of the user device can request the content at a second bitrate that is different from the first bitrate. The manifest server can access the advertisement list either local or from the central computing device and can use the advertisement list to create a second manifest file. The second manifest file can comprise instructions for acquiring the requested content at the second bitrate and the advertisements in the advertisement list at the second bitrate.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 3 is an exemplary display;

FIG. 5 is a flow chart of an exemplary method;

FIG. 6 is a flow chart of an exemplary method;

FIG. 7 is a flow chart of an exemplary method; and

DETAILED DESCRIPTION

Figure 1:
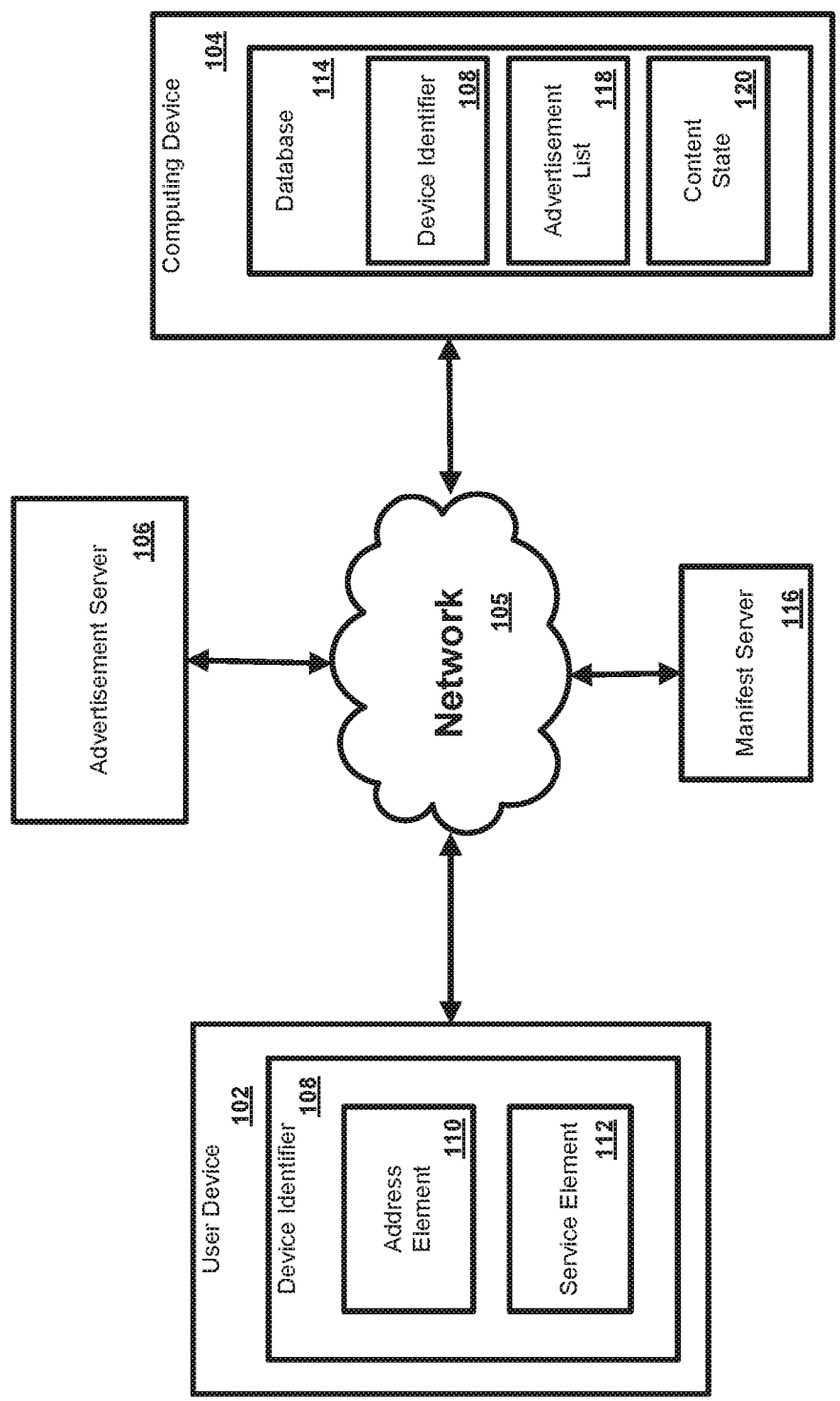
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by, special purpose hardware-based computer systems that perform the specified functions or steps, or combinations of special purpose hardware and computer instructions.

In one aspect of the disclosure, a system can be configured to ensure advertising continuity to a user device. Those skilled in the art will appreciate that the present methods may be used in various types of networks and systems that employ both digital and analog equipment. One skilled in the art will appreciate that provided herein is a functional description and that the respective functions can be performed by software, hardware, or a combination of software and hardware. The present disclosure is directed to systems and methods for providing content comprising advertising to a user device such as a computer, a tablet, a mobile device, a communications terminal, or the like. In an aspect, the user device can comprise an identifier which can be globally unique, such as a media access control (MAC) address. In another aspect, the identifier can comprise a token. The user device can request content, For example, the content request can comprise a request for a manifest file. A manifest file can be a sequential list of video fragments to play to render content and/or advertisements. The manifest file can comprise references to content video fragments and/or references to advertising video fragments. The content request can be for a manifest file for content and/or advertisements at a first bitrate. In an aspect, the content request can comprise the identifier. The identifier can be used to identify the origin of the content request, as the content request is forwarded amongst the devices in the network. In an aspect, a computing device, such as a content server, can receive the content request.

The computing device can forward the content request to an advertisement server. The advertisement server can return an advertisement list to the computing device. The advertisement list can comprise a list of specific advertisements in a specific order. In an aspect, the computing device can forward the content request and the advertisement list to a manifest server. In an aspect, the manifest server can be configured to create a manifest file in response to the content request. In an aspect, the manifest server can be configured to create a content state that can be used to track details/parameters of the content associated with the manifest file such as title, bitrate, etc. For example, the content state can track that a program is being streamed to a device at 480p24. The content state can be any data structure suitable for organizing data, such as a list, database table, etc. The content state represents the state of the content at the user device for which the manifest file was created. In an aspect, the content state can be registered with a central computing device. In an aspect, the content state can be transmitted to a plurality of manifest servers. In an aspect, the content state can be maintained at the central computing device. In a further aspect, the plurality of manifest servers can check the content state at the central computing device in response to receiving a request for a manifest file. In an aspect, the central computing device can be configured to link the identifier of the user device with the advertisement list and the content state. In an aspect, the user device can receive the manifest file. In an aspect, the user device can use the manifest file to retrieve and render the content and advertisements. In an aspect, the user device can request video (content and/or advertisement) fragments from the corresponding locations in the manifest file. In an aspect, the requested content and advertisements can be streamed to the user device. In an aspect, the user device can render the content with advertisements interspersed therein. In an aspect, the systems and methods described herein can ensure that a stream change during playing of an advertisement, such as that caused by an adaptive bitrate quality change, results in continued playing of the same advertisement that the customer was viewing. An adaptive bitrate quality change can comprise, for example, a request for a lower quality bitrate in response to a determination that available bandwidth is decreasing. In another example, an adaptive bitrate quality change can comprise a request for a higher quality bitrate in response to a determination that available bandwidth is increasing. In an aspect, the user device can be playing the content at the first bitrate and be in the middle of one of the advertisements when the user device needs to change bitrates. The user device might need to change bitrates because of a change in quality, for example. The user device might require a better quality or a worse quality. For example, network latency can cause a user device to need a lower quality video (e.g., video at a lower bitrate).

The user device can make another content request for another manifest file for the content at a second bitrate. In an aspect, even though the video fragments referred to in the new manifest file are at the second bitrate, the advertising video segments can be the same content as the advertising video segments in the previous manifest file at the first bitrate. In a further aspect, the advertising video segments can be at the first bitrate, the second bitrate, or another bitrate.

FIG. 1 illustrates various aspects of an exemplary environment in which the present methods and systems can operate. In an aspect, the disclosed systems can comprise a user device 102 in communication with a computing device 104 such as a content server, for example. The user device 102 and the computing device 104 can be in communication via a private and/or public network 105 such as a proprietary line from a service provider and/or the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing, device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.), As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the user device 102 can transmit a request for content. In an aspect, the request for content can be transmitted to a computing device 104, such as a content server. In a further aspect, the request for content can be forwarded from the computing device 104 to a manifest server 116. In an aspect, the request for content can be transmitted directly to a manifest server 116 from the user device 102.

In an aspect, the manifest server 116 can create a manifest file in response to the request for content from the user device 102. The manifest file can comprise references to video fragments. In an aspect, video fragments can share a characteristic, such as a bitrate, a resolution, etc. In an aspect, the video fragments can be homogeneous or heterogeneous in size, relative to each other. In an aspect, the video fragments can relate to the requested content. In an aspect, the video fragments can relate to advertisements. In an aspect, the references can be uniform resource locators (URLs).

In an aspect, an advertisement server 106 can be queried. In an aspect, the computing device 104 can query the advertisement server 106. In an aspect, the manifest server 116 can query the advertisement server 106.

In an aspect, the advertisement server 106 can create an advertisement list 118 in response to the query. The advertisement list 118 can be transmitted to the manifest server 116. The advertisement list 118 can be transmitted to the computing device 104. In an aspect, a manifest server 116 can use the advertisement list 118 to include references to video fragments of the advertisements in the advertisement list 118 in a manifest file. The manifest server 116 can create a content state 120 associated with the user device 102. In an aspect, the computing device 104 can create the content state 120 associated with the user device 102. The content state 120 can comprise identification of the content represented in the manifest file. In an aspect, the content state 120 can comprise various parameters (e.g., attributes, properties, preferences, options, etc.) of the content represented in the manifest file. The parameters included in the content state 120 can comprise a titrate of the content. In an aspect, in response to the inclusion of the advertisement list 118 in the manifest file, the computing device 104 can relate the device identifier 108, the advertisement list 118, and the state 120 in a database 114.

In an aspect, the computing device 104 can be a server for communicating with the user device 102. As an example, the computing device 104 can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations (e.g., the user device 102) via a distribution system.

The manifest server 116 can transmit and/or cause the manifest file to be transmitted (e.g., delivered, provided, etc.) to the user device 102. In another aspect, the manifest server 116 can transmit the manifest file to the computing device 104 and the computing device 104 can transmit the manifest file to the user device 102. The user device 102 can request the video fragments at the locations included in the manifest file to create (e.g., assemble, build, retrieve, etc.) video.

In an aspect, the computing device 104 can manage advertising to be included with in content transmitted to the user device 102. In an aspect, the computing device 104 can comprise a database 114 for linking the device identifier 108 with the advertisement list 118 used to create the manifest file used by the user device 102 and/or the content state 120. As an example, when the manifest server 116 creates a manifest file for the user device 102, the manifest server 116 can transmit a signal to the computing device 104, wherein the signal comprises the device identifier 108 of the user device 102. In response to the signal, the computing device 104 can query the database 114 for device identifier 108. If a content state 120 and advertisement list 118 exists for the device identifier 108, then the content state 120 can be checked to see if the advertisement list 118 should be used for the manifest file being created by the manifest server 116. For example, if the content state 120 indicates that the content currently being requested by the user device 102 is not the same as the content currently being, presented by the user device 102, then there is no need to use the same advertisement list 118. In an aspect, if the content represented in the content state 120 is the same as the content in the currently created manifest file, and the parameters are the same, then the same manifest file can be returned to the user device 102. The advertisement list 118 can be used in creating a new manifest file if the content represented in the content state 120 is the same as the content in the currently created manifest file, but the parameters are different. For example, if the user device 102 requested the same content, but at a different bitrate, then the same advertisement list 118 should be used to create the manifest file. If it is determined that the same advertisement list 118 should be used, then the manifest server 116 can use the same advertisement list 118 to create the manifest file. If it is determined that the same advertisement list 118 should not be used, then the manifest server 116 can receive a new advertisement list 118 from the advertisement server 106. In an aspect, a state can comprise the advertisement list 116 and content state 120 and be associated with a device identifier 106.

Upon completion of creation of the new manifest file, the manifest server 116 can transmit and/or cause the newly created manifest file to be transmitted (e.g., delivered, provided, etc.) to the user device 102. In another aspect, the manifest server 116 can transmit the new manifest file to the computing device 104 and the computing device 104 can transmit the new manifest file to the user device 102. The user device 102 can request the video fragments at the locations included in the new manifest file to create (e.g., assemble, build, retrieve, etc.) video. In an aspect, video fragments referred to in the new manifest file can be for the same advertisements as in the previous manifest file, only with a different parameters or attributes (e.g., a different bitrate, a different codec, a different size, combinations thereof, and the like). For example, video fragments referred to in the new manifest file can be for the same advertisements as in the previous manifest file, only at the second bitrate.

Figure 2A:
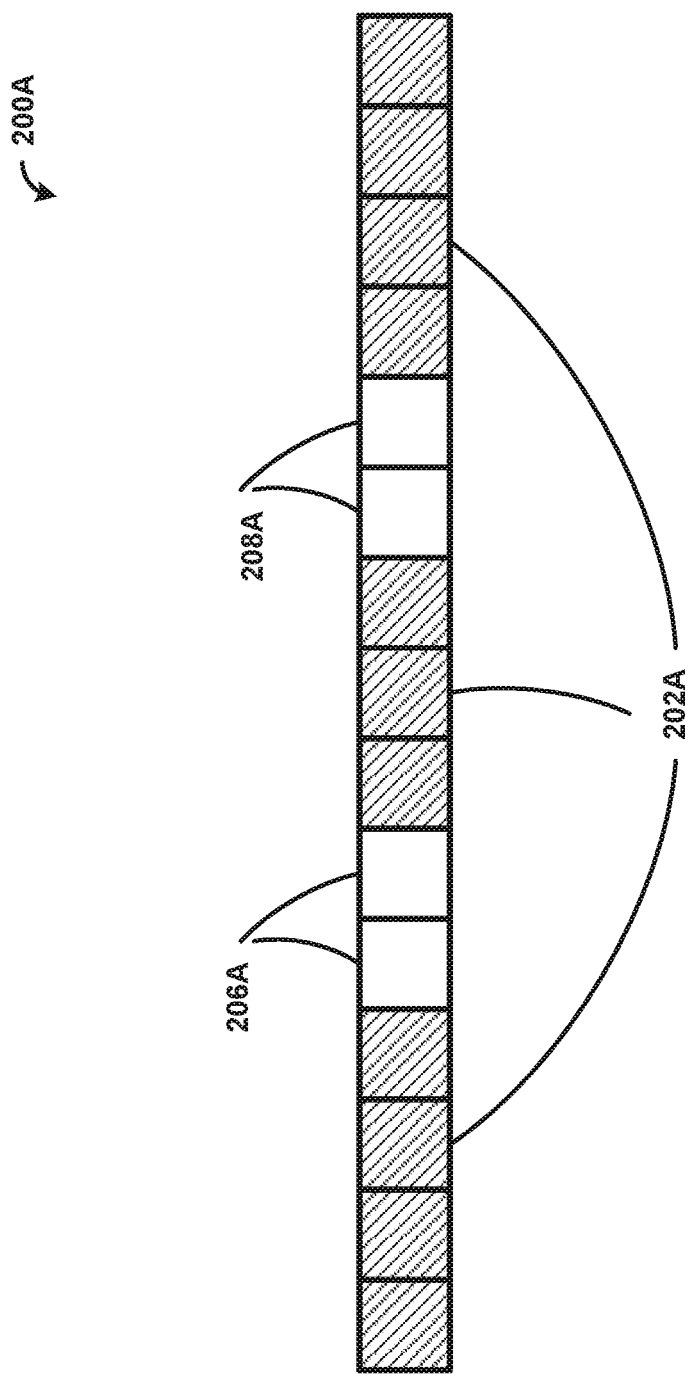
FIGS. 2A and 2B are block representations of exemplary sequential data fragments.

FIG. 2A illustrates a block representation of an exemplary set of sequential data fragments 200A. In an aspect, the set of sequential data fragments 200A can be assembled using a manifest file comprising references to the set of sequential data fragments 200A, which can be generated by the manifest server 116, for example. In an aspect, the references can be uniform resource locators (URLs). The set of sequential data fragments 200A can comprise data fragments 202A, 206A, and 208A. In an aspect, the data fragments 202A can represent requested content (e.g., video content). The data fragments 206A can represent a first advertisement (e.g., a video advertisement) and the data fragments 208A can represent a second advertisement (e.g., a video advertisement). In an aspect, each data fragment can comprise video and first parameters (e.g., details) related to the video. The first parameters can be content-related parameters. In a further aspect, the first parameters can comprise a first bitrate of the video. In another aspect, the first parameters can comprise a first codec used for encoding and/or used for decoding the video. In yet another aspect, the first parameters can comprise a first format, such as a first size of a display for which the video is formatted.

Figure 2B:
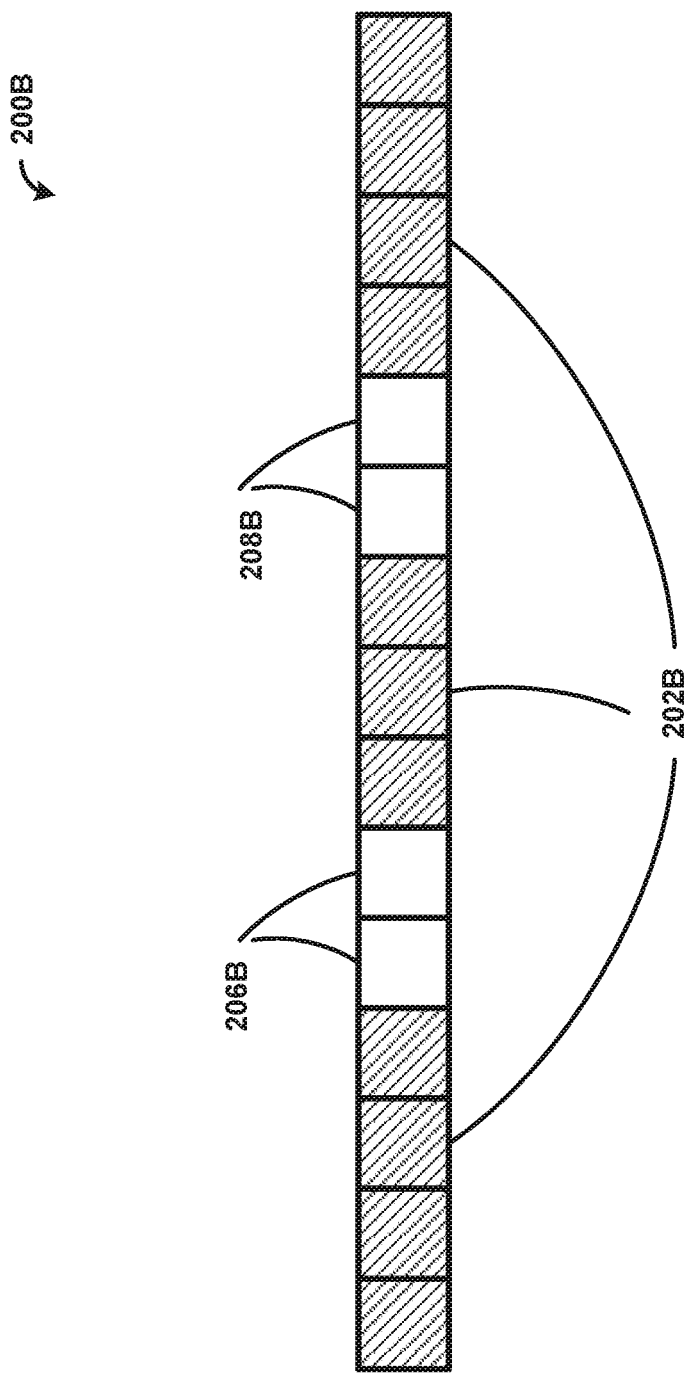

Turning now to FIG. 2B, the user device or client may request another version of the content, and also another manifest file. This can occur, for example, if the network connection used by the user device changes, and the user device may seek the content in a lower or higher bitrate to accommodate changing network conditions. If the user device 102 requests the same content with second parameters (for example, the same content, but at a second bitrate), then a new set of sequential data fragments 200B can be received from the source comprising data fragments 202B which comprise the content with the second parameters. The second parameters can be content-related parameters. In an aspect, the new set of sequential data fragments 200B can be assembled using a manifest file from the manifest server 116. The new set of sequential data fragments 200B can comprise data fragments 206B representing the first advertisement and/or data fragments 208B representing the second advertisement. To minimize disruption to a viewing experience, the systems and methods described herein can ensure that an advertisement, such as the first advertisement, that is displayed during the request for another version of the content, is displayed after the request for another version of the content is fulfilled. In an aspect, it can be determined that a version of the first advertisement having the second parameters is available and can be included in the data fragments 206B in order to match the second parameters of the requested content. For example, the first advertisement is also available at a second bitrate. However, in some instances, it might be determined that there is no version of the first advertisement available having the second parameters (e.g., the first advertisement may not be available at the second bitrate). In such a scenario, the first advertisement included in the data fragments 206B can be a version of the first advertisement at the same (e.g., original, first) parameters as in the set of sequential data fragments 200A, For example, the data fragments 206B representing the first advertisement can be at the first bitrate. Alternatively, if it is determined that there is no version of the first advertisement available with the second parameters, then a version of the first advertisement included in the data fragments 206B can comprise third parameters (e.g., not the same parameters as originally delivered version of content nor the same parameters as the newly requested version of content). For example, the first advertisement can be at a third bitrate. The third parameters can be content-related parameters. The third parameters can be a closest available version of the first advertisement to the second parameters. For example, the third bitrate can be a bitrate closest to the second bitrate at which the first advertisement is available. The third parameter can be closer to the second parameter than the first parameters. For example, the third bitrate can be closer to the second bitrate than the first bitrate. Although the examples focused on bitrates, other parameters (e.g., codec used for encoding, format, size, etc.) can be used, FIG. 3 illustrates an exemplary display in accordance with the systems and methods described herein. In an aspect, display 302 shows content 304 at a first bitrate. In another aspect, the display 302 can represent the content 304 encoded by a first codec. In yet another aspect, the display 302 can comprise a first size and can represent the content 304 formatted for the first size. In an aspect, display 306 can represent the same content 304 but with a second parameter. In a further aspect, the display 306 can show content 304 at a second bitrate. In an aspect, the content 304 at the first bitrate can be at a lower bitrate than the content 304 at the second bitrate. In an aspect, the content 304 at the first bitrate can be at a higher bitrate than the content 304 at the second bitrate. In another aspect, the display 302 can represent the content 304 encoded by a second codec. In yet another aspect, the display 302 can comprise a second size and can represent the content 304 formatted for the second size. In an aspect, the first size can be greater than the second size. In an aspect, the first size can be less than the second size. In an aspect, the display 302 can represent the content 304 displayed when a buffer comprises less than and/or equal to a predetermined threshold number of video frames or other units of the content 304. In an aspect, the display 306 can represent the content 304 displayed when a buffer comprises more than and/or equal to a predetermined threshold number of video frames or other units of the content 304.

Figure 4A:
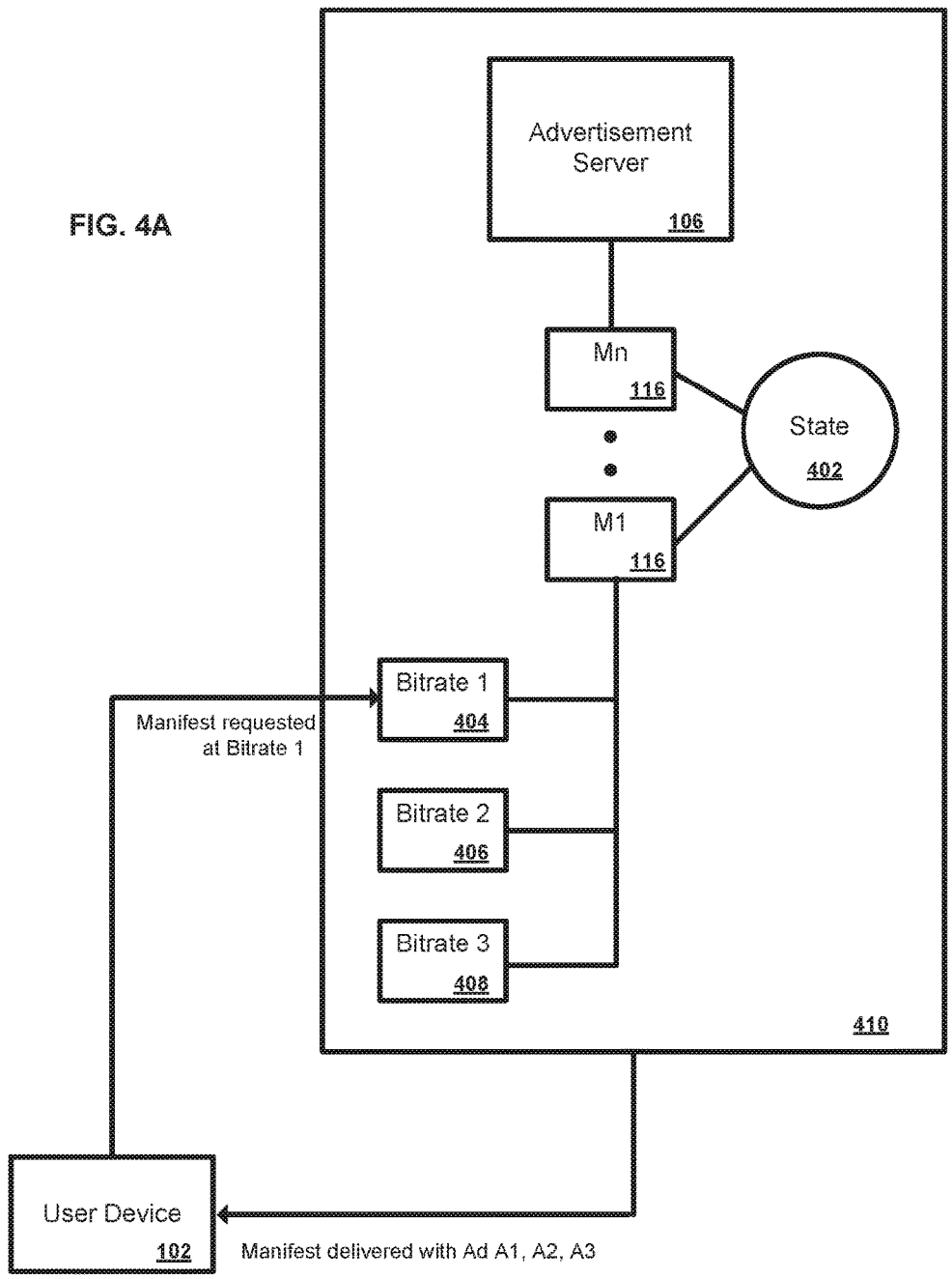
FIGS. 4A and 4B are block diagrams of an exemplary system.
Figure 4B:
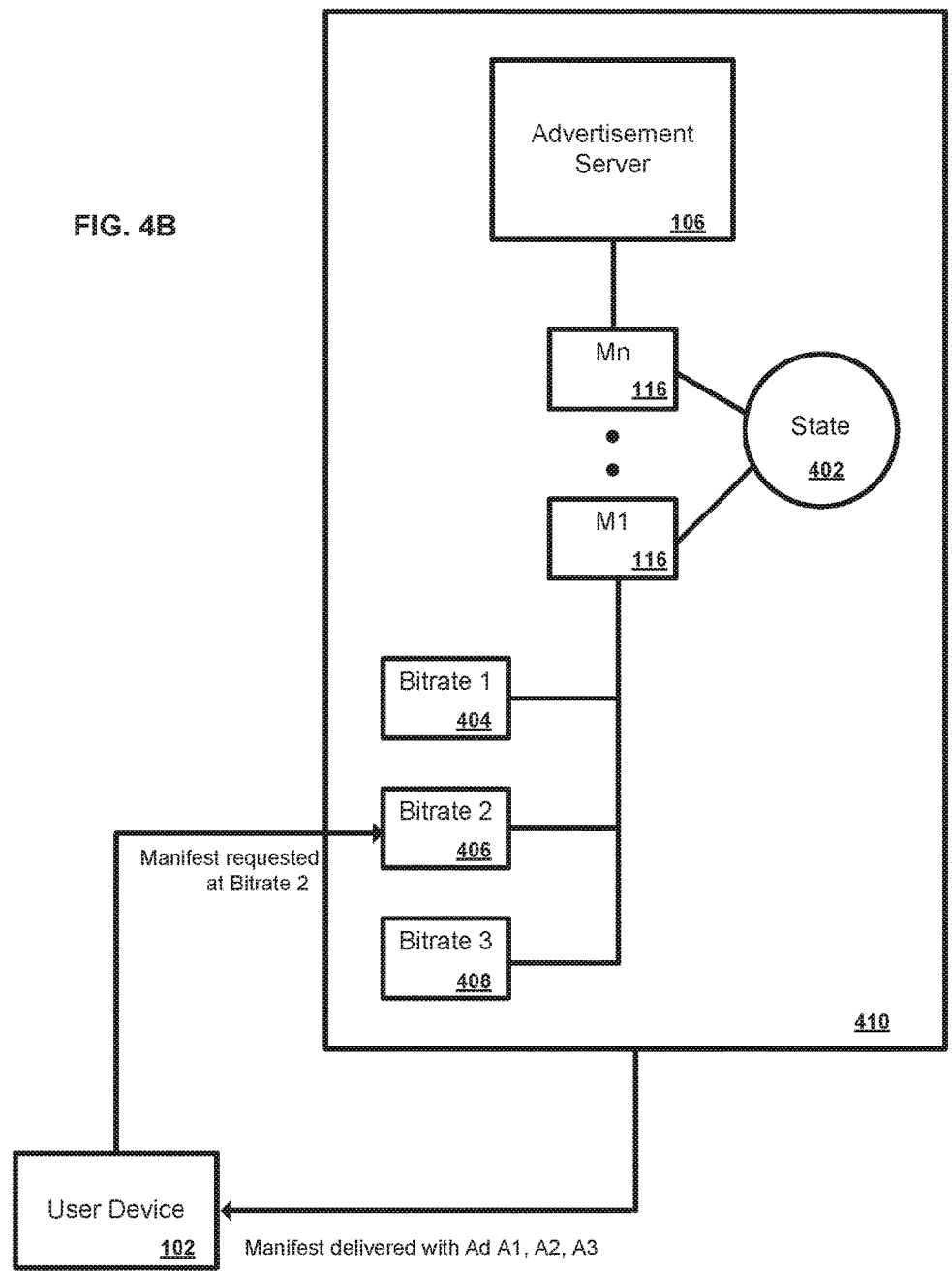

FIGS. 4A and 4B illustrate block diagrams representing an exemplary system and architecture. The methods and systems described herein can be used in conjunction with content comprising any number of attribute or parameter options. For example, FIGS. 4A and 4B illustrate content comprising multiple bitrate options. Turning first to FIG. 4A, a user device 102 (e.g., a video player or client) can request content at a first bitrate 404 from a content provider or content delivery network 410. In an aspect, the content can also be available from the content provider 410 at a second bitrate 406 and a third bitrate 408. In response to the request, the content provider 410 can query an advertisement server 106. The advertisement server 106 can determine that Advertisements A1, A2, and A3 should be inserted into the requested content and returned to the user device 102. A first manifest server (M1) 116 of a plurality of manifest servers (M1 . . . Mn) 116 associated with the content provider or deliver network 410 can create and deliver a first manifest file to the user device 102. The first manifest file may comprise references to the requested content at the requested bitrate 404 and references to Advertisements A1, A2, and A3 at the requested bitrate 404. In an aspect, the first manifest server 116 can create state information 402 associated with the first manifest file, where the state information 402 can comprise all of the parameters and attributes of the content for which the manifest file was created. The manifest server 116 may transmit the state information 402 to one or more of the rest of the plurality of manifest servers 116. In another aspect, the first manifest server 116 can create the state information 402 and transmit the state information 402 to a central location accessible to the plurality of manifest servers 116. In an aspect, the state information 402 can comprise the advertisement list and content state 120 and be associated with a device identifier 106. The state information 402 can be associated with a particular manifest file that was generated and/or sent to a user device. The state information 402 can be stored as a separate file from the particular manifest file, linked by an identifier(s) or the state information 402 can be stored as part of the particular manifest file. The result is that the particular manifest file can be used to readily provide a location for a version (e.g., content/advertisement at a specific (or proximate) requested parameters) of requested content/advertisements that best fits a request by referencing the state information 402.

Turning now to FIG. 4B, the user device 102 can request the content at the second bitrate 406 from the content provider 410. The request can be sent or received after a portion of the content has already been transmitted to the user device 102, or consumed by a user of the device 102. In an aspect, any of the plurality of manifest servers 116 associated with the content provider or delivery service 410 can receive the request and check the state information 402. In an aspect, the manifest server 116 in receipt of the request or a centrally located computing device 104 can recognize that the requested content at the second bitrate 406 is the same content currently being consumed by, or delivered to the user device 102 at the first bitrate 404 (e.g., via a content identifier). For example, the manifest server 116 in receipt of the request (or a centrally located computing device 104) can recognize that the content currently being consumed by, or delivered to, the user device 102 comprises the same content identifier as the content currently being requested and that the content is currently being consumed or delivered with parameters different from the parameters currently being requested. In another example, the manifest server 116 in receipt of the request or a centrally located computing device 104 can access state information 402 to match the content identifier of the content currently being consumed by, or delivered to the user device 102 with the content identifier of the content currently being requested and access the state information 402 to determine that the content is currently being consumer or delivered with parameters different from the parameters currently being requested. The manifest server 116 can create a second manifest file that comprises references to the content at the second bitrate 406. The advertisement list can be accessed using the state information 402. Advertisements A1, A2, and A3 can be determined to be in the first manifest file. The second manifest file can also comprise references to the Advertisements A1, A2, and A3 at the second bitrate 406, since such advertisements were identified to be inserted into the content by accessing the state information 402. In an aspect, if one or more of the Advertisements A1, A2, or A3 are not available at the second bitrate 406, then a suitable replacement for the unavailable advertisement, such as the advertisement at the closest bitrate to the second bitrate 406, an advertisement for a same company and/or product as the unavailable advertisement, and the like, can be included. In an aspect, the second manifest file can comprise references to one or more of the Advertisements A1, A2, and A3 at the first bitrate 404, if the one or more Advertisements are unavailable at the second bitrate 406. In an aspect, the second manifest file can comprise references to one or more of the Advertisements A1, A2, and A3 at the third bitrate 408, if the one or more Advertisements is unavailable at the second bitrate 406. The second manifest file can be delivered to the user device 102. The state information 402 can be updated to reflect the second manifest file delivered to the user device 102. For example, the updated state information 402 can comprise the second parameters. The updated state information 402 can be transmitted to one or more of the plurality of manifest servers 116. In another aspect, the updated state information 402 can be transmitted to a central location accessible to the plurality of manifest servers 116.

FIG. 5 illustrates an exemplary method 500, which, in one example, may be implemented by on one or more manifest servers 116. At step 502, a request of selection for content can be received from a user device. In an aspect, the requested content can be video content. In an aspect, the user device can be a set top box, a computing device, a mobile device, a gateway and the like. The request or selection can comprise one or more first requested parameters or attributes, for example, a first bitrate, a first codec, a first file size or frame rate, combinations thereof, and the like. Optionally, the selection for content can comprise a device identifier associated with the user device. In an aspect, the device identifier can be a media access control (MAC) address. In another further aspect, the identifier can comprise a token. In an aspect, the token can be globally unique.

At step 504, a first manifest file, comprising for example a reference to content fragments and a first plurality of advertising fragments at the first parameters, can be generated. A first manifest file comprising a reference to fragments of the content at the first bitrate and a reference to a first plurality of advertising fragments at the first bitrate, encoded with the first codec, and/or formatted for the first size, can be generated. In an aspect, the references can be to an order of fragments or locations where the fragments can be retrieved. In a further aspect, the references can be uniform resource identifiers (URIs). In a further aspect, the references can be uniform resource locators (URLs).

At step 506, state information associated with the first manifest file and other information, such as the device identifier and parameters, can be created and/or stored. Optionally, the state information can comprise an advertisement list related to the first plurality of advertising fragments (e.g., the video fragments that make up each of the advertisements in the advertisement list). Optionally, the state information can represent a content state. In an aspect, the content state can comprise identification of the selected content. In an aspect, the content state can comprise the first parameters, for example, the first bitrate, the first codec, the first size, combinations thereof and the like.

At step 508, a request or selection comprising second parameters can be received from the user device. The second parameters can be, for example, a second bitrate, a second codec, a second size or rate, combinations thereof, and the like, In an aspect, the request or selection is for the same content, but with one or more different, or second parameters. In an aspect, the selection for the second parameters can be received while the user device is rendering or displaying an advertisement or other portion of content associated with the first manifest file. In an aspect, the selection can comprise the device identifier from the user device.

At step 510, the state information associated with the first manifest file and/or device identifier can be accessed. In an aspect, the device identifier in the selection can be used to access the state information. In an aspect, the state information can be accessed from a local or remote memory. In an aspect, the state information can be retrieved from a remote computing device.

At step 512, a second manifest file can be generated. In an aspect, the second manifest file can comprise a reference to fragments of the content with the second parameters. In an aspect, the second manifest file can comprise a reference to fragments of the content at the second bitrate, encoded with the second codec, formatted for the second size, combinations thereof, and the like. In an aspect, the second manifest file can comprise a reference to a second plurality of advertising fragments. In an aspect, the second plurality of advertising fragments can be related to the first plurality of advertising fragments in the state information, In an aspect, the second plurality of advertising fragments can refer or point to the same advertisements as the first plurality of advertising fragments. To minimize disruption to a viewing experience, the systems and methods described herein can ensure that an advertisement, such as the first plurality of advertising fragments, that is displayed during the request or selection for second parameters, is displayed after the request or selection is fulfilled. Therefore, the second plurality of advertising fragments can comprise the same advertisement as the first plurality of advertising fragments, even if the advertisement is not available with the second parameters. In an aspect, the second plurality of advertising fragments can comprise third parameters. In an aspect, the second plurality of advertising fragments can comprise a third bitrate, can be encoded with a third codec, can be formatted for a third size, combinations thereof, and the like. In an aspect, the third parameters can be the same as the first parameters. In an aspect, the third bitrate can be the same as the first bitrate. In an aspect, the third codec can be the same as the first codec. In an aspect, the third size can be the same as the first size. In an aspect, the third parameters can be the same as the second parameters. In an aspect, the third bitrate can be the same as the second bitrate. In an aspect, the third codec can be the same as the second codec. In an aspect, the third size can be the same as the second size. In an aspect, the third parameters can be different from the first parameters and the second parameters. In an aspect, the third bitrate can be different from the first bitrate and the second bitrate. In an aspect, the third codec can be different from the first codec and the second codec. In an aspect, the third size can be different from the first size and the second size.

In an aspect, the second plurality of advertising fragments can be related to the first plurality of advertising fragments. Optionally, the second plurality of advertising fragments can comprise a reference to advertising fragments that represent different advertisements from advertisements represented by the first plurality of advertising fragments. For example, this could be due to a different advertisement being chosen for the user when the second request is received (e.g., the different advertisement may be more relevant at a second, later point in time). Optionally, one or more different advertisements can be added to the advertisement list in the state information. In an aspect, the one or more different advertisements can replace one or more advertisements previously in the advertisement list. In a further aspect, the one or more different advertisements can be related to the respective one or more advertisements being replaced. In an even further aspect, one of the one or more different advertisements can be for the same product as the advertisement being replaced. In another further aspect, one of the one or more different advertisements can be for the same company as the advertisement being replaced. In an aspect, an advertisement currently displayed is the same advertisement displayed after the change in parameters. In an aspect, an advertisement currently displayed is the same advertisement displayed after the change in bitrate. In an aspect, an advertisement currently displayed is the same advertisement displayed after the change in codec. In an aspect, an advertisement currently displayed is the same advertisement displayed after the change in size.

FIG. 6 illustrates an exemplary method 600, executing on a user device 102. At step 602, a selection for content can be transmitted. The selection for content can comprise a selection for a first parameter. The first parameter can be, for example, a first bitrate, a first codec, a first size, combinations thereof, and the like. The selection for content can comprise an identifier. In an aspect, the identifier can be associated with the user device. In an aspect, the identifier can be a media access control (MAC) address. In a further aspect, the identifier can comprise a token. In an aspect, the token can be globally unique. In an aspect, the user device can be a set top box, a computing device, a mobile device, and the like. In an aspect, the content can comprise video.

At step 604, a first data stream can be received. The first data stream can comprise the selected content comprising first parameter. For example, the first parameter can comprise a first bitrate, a first codec, a first size, combinations thereof, and the like. The first data stream can comprise a plurality of advertisements. The plurality of advertisements can comprise the first parameter. For example, the plurality of advertisements can be at the first bitrate, encoded with the first codec, formatted for the first size, combinations thereof, and the like. In an aspect, the first data stream can comprise an Internet Protocol (IP) stream.

At step 606, the first data stream can be presented on a display device. In an aspect, the display device can be a television, a monitor, a mobile device, and the like.

At step 608, a selection for a second parameter can be transmitted while one of the first plurality of advertisements is displayed on the display device. The second parameter can be, for example, a second bitrate, a second codec, a second size, combinations thereof, and the like. At step 610, a second data stream comprising the selected content with the second parameter can be received. For example, the second data stream can comprise the selected content at the second bitrate, the selected content encoded with the second codec, the selected content formatted for the second size, combinations thereof, and the like. In an aspect, the second data stream can comprise a second plurality of advertisements. The second data stream can comprise an Internet Protocol (IP) stream.

At step 612, a transition from displaying the first data stream to displaying the second data stream can be made. Optionally, the transition can happen while the one of the first plurality of advertisements is displayed on the display device. In an aspect, the second data stream can be presented on the display device. The transition from displaying the first data stream to displaying the second data stream can maintain continuity. In an aspect, maintaining continuity can comprise a seamless transition that is not perceptible to a viewer. In an aspect, maintaining continuity can comprise beginning display of the second data stream at or just after a time point where display of the first data stream ended, despite a possible perceivable difference in display quality before and after the transition. In an aspect, maintaining continuity can comprise displaying the same advertisement before and after the transition. In an aspect, maintaining continuity can comprise displaying an advertisement for the same company and/or product after the transition as was being displayed before the transition. The advertisement can be displayed on the display device. In an aspect, the advertisement can be displayed on the display device with the second parameter. For example, the advertisement can be displayed on the display device at the second bitrate, using the second codec, at the second size, combinations thereof, and the like. In an aspect, the advertisement can be displayed on the display device with the first paramter. For example, the advertisement can be displayed on the display device at the first bitrate, using the first codec, at the first size, combinations thereof, and the like. In an aspect, the advertisement can be displayed on the display device with the third parameter. For example, the advertisement can be displayed on the display device at the third bitrate, using the third codec, at the third size, combinations thereof, and the like.

FIG. 7 illustrates an exemplary method 700, executing on one or more manifest servers 116. At step 702, an identifier of a user device, an identifier of content with a first parameter, and an identifier of a plurality of advertisements with the first parameter can be received at a first manifest server. The first parameter can be, for example, a first bitrate, a first codec, a first size, combinations thereof, and the like. In an aspect, the received identifiers can be received in response to a request. In an aspect, a request for a first video stream can be received at a first manifest server of a plurality of manifest servers from a user device. In an aspect, the request for the first video stream can comprise a request for content with the first parameter. In an aspect, the first video stream can comprise Internet Protocol (IP) delivery. In an aspect, the user device can be a set top box, a computing device, a mobile device, and the like.

At step 704, a first manifest file can be generated. In an aspect, the first manifest file can be generated in response to the request. In an aspect, the first manifest file can comprise an identifier. In an aspect, the identifier can comprise a device identifier associated with the user device. In an aspect, the identifier can comprise a device identifier associated with the user device originating the request for the first video stream. In a further aspect, the identifier can comprise a media access control (MAC) address associated with the device originating the request for the first video stream. In another further aspect, the identifier can comprise a token. In an aspect, the token can be globally unique. In an aspect, the first manifest file can comprise a reference to the content with the first parameter. For example, the first manifest file can comprise a reference to the content at the first bitrate, the content encoded with the first codec, the content formatted for the first size, combinations thereof, and the like. In an aspect, the first manifest file can comprise a first plurality of references to the plurality of advertisements at the first parameter. For example, the first manifest file can comprise a first plurality of references to the plurality of advertisements at the first bitrate, a first plurality of references to the plurality of advertisements encoded at the first codec, a first plurality of references to the plurality of advertisements formatted for the first size, combinations thereof, and the like.

At step 706, the first manifest file can be transmitted to the user device. In an aspect, the user device can use the reference to the content in the first manifest file to request content. In an aspect, the reference to the content can comprise a uniform resource identifier (URI). In a further aspect, the reference to the content can comprise a uniform resource locator (URI). In an aspect, the user device can use the first plurality of references to the plurality of advertisements in the first manifest file to request one of the plurality of advertisements. In an aspect, the first plurality of references to the plurality of advertisements can comprise uniform resource identifiers (URIs). In a further aspect, the first plurality of references to the plurality of advertisements can comprise uniform resource locators (URLs).

At step 708, the first manifest file, or a reference to the first manifest file that can be used to identify information in the first manifest file, can be stored such that it is easily identifiable and accessible by a plurality of manifest file generating devices. An identifier of the user device can be associated with the first manifest file. In an aspect, the first manifest file and/or the user device identifier can transmitted to a second manifest server, of a plurality of manifest servers, that may be centrally located or easily accessible by other manifest file servers. At step 710, the identifier of the user device and an identifier of the content with a second parameter can be received at any of the manifest file servers or computing devices. The second parameter can be, for example, a second Nitrate, a second codec, a second size, combinations thereof, and the like. A subsequent request for a second video stream of the content with the second parameter can be received from the user device at any of the plurality of manifest servers.

At step 712, the content and the plurality of advertisements can be identified based on the first manifest file and/or the identifier of the user device. A determination can be made that the user device is requesting content already playing at the user device. For example, a content identifier of the content already playing at the user device can be matched with a content identifier of the requested content using the first manifest file and/or the identifier of the user device. The first parameter can be identified using the first manifest file and/or the identifier of the user device and can be determined to be different from the second piarameter. Therefore, the plurality of advertisements in the first manifest file can be identified. In an aspect, the plurality of advertisements can be identified in response to receiving the identifier of the user device. For example, the identifier of the user device can be received in a request to generate a manifest file. In an aspect, the plurality of advertisements can be identified locally. In an aspect, the plurality of advertisements can be identified by transmitting the identifier of the user device to a central computing device. Identifying the plurality of advertisements can allow the plurality of advertisements to be used in a newly generated manifest file. Therefore, the need to generate a new plurality of advertisement can be alleviated. Additionally, if a new plurality of advertisements is needed, the plurality of advertisements in the first manifest file (e.g., what advertisements has the viewer seen; what advertisements the viewer was scheduled to view, but has not seen yet; what advertisement the viewer was currently watching; etc.) can be considered in creating the new plurality of advertisements. The knowledge of the plurality of advertisements in the first manifest file can help prevent the viewer from being exposed to the same advertisements repeatedly.

At step 714, a second manifest file can be generated. In an aspect, the second manifest file can comprise the identifier of the user device. In an aspect, the second manifest file can comprise a reference to the content at the second parameter. In an aspect, the second manifest file can comprise a second plurality of references to the plurality of advertisements. In an aspect, the subsequent request for the second video stream can cause the second manifest file to be created. In an aspect, the second manifest file can synchronize advertising content with the first manifest file. In an aspect, the second video stream can comprise Internet Protocol (IP) delivery. In an aspect, the second manifest file can comprise references to the same advertising content as the first manifest file. In an aspect, the same advertising content can be at the second parameter. In an aspect, the same advertising content can be at the first parameter. In an aspect, the same advertising content can be at a third parameter.

At step 716, the second manifest file can be transmitted to the user device. In an aspect, the user device can use the reference to the content in the second manifest file to request content. In an aspect, the reference to the content can comprise a uniform resource identifier (URI). In a further aspect, the reference to the content can comprise a uniform resource locator (URL). In an aspect, the user device can use the first plurality of references to the plurality of advertisements in the second manifest file to request one of the plurality of advertisements. In an aspect, the first plurality of references to the plurality of advertisements can comprise uniform resource identifiers (URIs). In a further aspect, the first plurality of references to the plurality of advertisements can comprise uniform resource locators (URLs).

Figure 8:
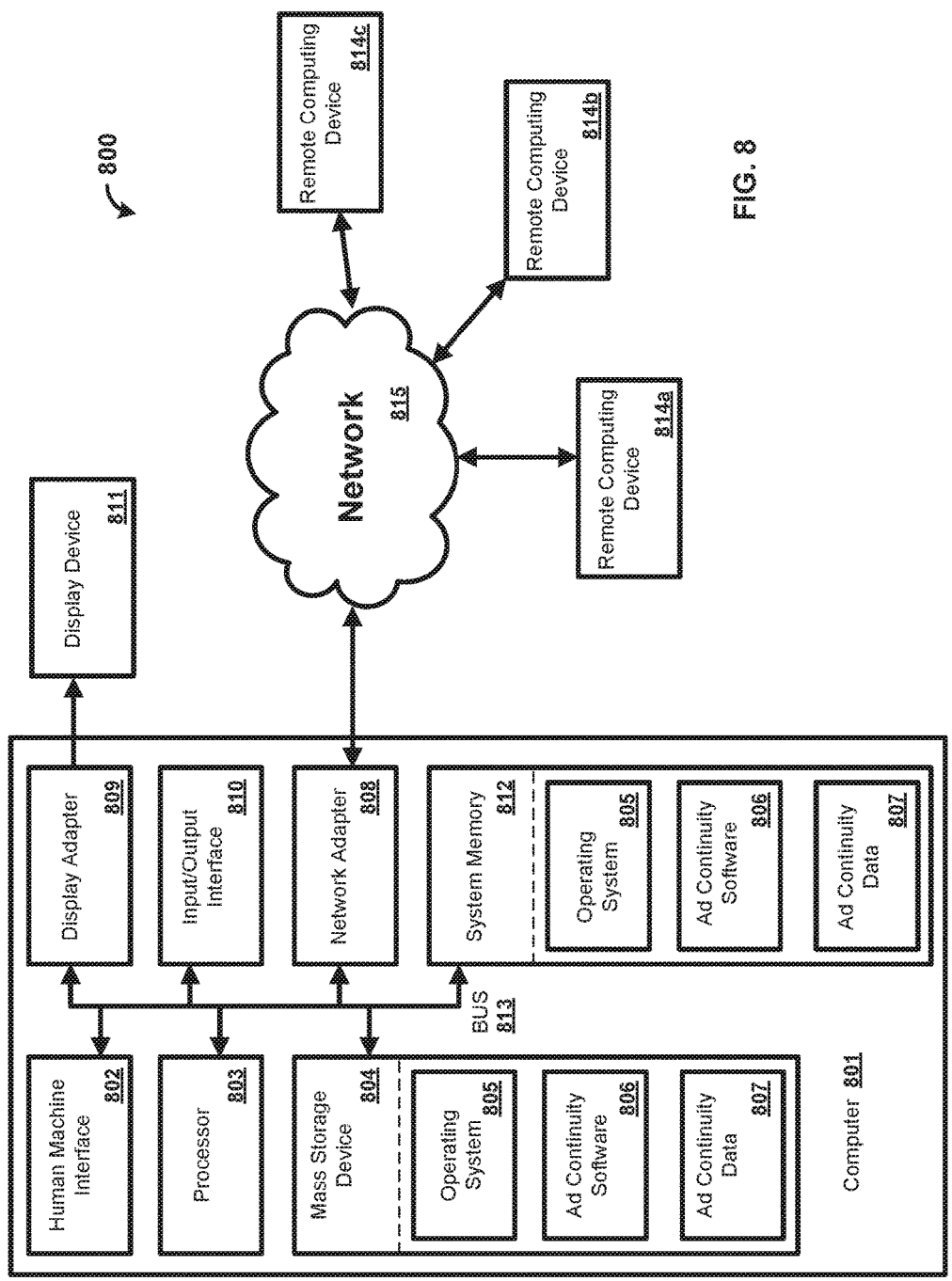
FIG. 8 is a block diagram of an exemplary computing device.

In an exemplary aspect, the methods and systems can be implemented on a computer 801 as illustrated in FIG. 8 and described below. By way of example, server 104 of FIG. 1 can be a computer as illustrated in FIG. 8. Similarly, the methods and systems disclosed can utilize one or more computers to perform one or more functions in one or more locations. FIG. 8 is a block diagram illustrating an exemplary operating environment for performing the disclosed methods, This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types, The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the one or more processors 803, a mass storage device 804, an operating system 805, advertising continuity software 806, advertising continuity data 807, a network adapter 808, the system memory 812, an Input/Output Interface 810, a display adapter 809, a display device 811, and a human machine interface 802, can be contained within one or more remote computing devices 814*a,b,c* at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the advertising continuity data 807 and/or program modules such as the operating system 805 and the advertising continuity software 806 that are immediately accessible to and/or are presently operated on by the one or more processors 803.

In another aspect, the computer 801 can also comprise other removable/non-removable, volatile/non-volatile computer storage media. By way of example, FIG. 8 illustrates the mass storage device 804 which can provide non-volatile storage of computer code, computer readable instructions, data structures, program modules, and other data for the computer 801. For example and not meant to be limiting, the mass storage device 804 can be a hard disk, a removable magnetic disk, a removable optical disk, magnetic cassettes or other magnetic storage devices, flash memory cards, CD-ROM, digital versatile disks (MID) or other optical storage, random access memories (RAM), read only memories (ROM), electrically erasable programmable read-only memory (EEPROM), and the like.

Optionally, any number of program modules can be stored on the mass storage device 804, including by way of example, the operating system 805 and the advertising continuity software 806. Each of the operating system 805 and the advertising continuity software 806 (or some combination thereof) can comprise elements of the programming and the advertising continuity software 806. The advertising continuity data 807 can also be stored on the mass storage device 804. The advertising continuity data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown), Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB), In yet another aspect, the display device 811 can also be connected to the system bus 813 via an interface, such as the display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via the Input/Output Interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more remote computing devices 814*a,b,c*. By way of example, a remote computing device can be a personal computer, portable computer, smartphone, a server, a router, a network computer, a peer device or other common network node, and so on. Logical connections between the computer 801 and a remote computing device 814*a,b,c* can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the one or more processors 803 of the computer. An implementation of the advertising continuity software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media.""Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial intelligence techniques such as machine learning and iterative learning. Examples of such techniques include, but are not limited to, expert systems, case based reasoning, Bayesian networks, behavior based Al, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   requesting, by a first manifest server, one or more advertisements at a first bit rate associated with a user device;
   in response to the request for the one or more advertisements at the first bit rate, receiving information comprising a plurality of references to the one or more advertisements at the first bit rate;
   generating a first manifest tile and state information associated with the first manifest file, wherein the first manifest file comprises a reference to fragments of content at the first bitrate and a reference of the plurality of references to a first plurality of advertising fragments of the one or more advertisements at the first bit rate;
   transmitting an identifier associated with the user device and the state information to a second manifest server;
   receiving, by the second manifest server, a request for the content wherein the request comprises the identifier associated with the user device and a selection of a second bitrate;
   determining, based on the identifier associated with the user device and the state information, the one or more advertisements; and
   generating, based on the one or more advertisements, a second manifest file comprising a reference to fragments of the content at the second bitrate and a reference to a second plurality of advertising fragments of the one or more advertisements at a third bitrate, wherein at least one of the second plurality of advertising fragments is related to at least one of the first plurality of advertising fragments.

2. The method of claim 1, herein the state information comprises one or more of an identifier associated with the content or an attribute of the content.

3. The method of claim 1, wherein the first plurality of advertising fragments comprises the same content as the second plurality of advertising fragments.

4. The method of claim 1, wherein the second bitrate is different from the third bitrate and the first bitrate is different from the third bitrate.

5. The method of claim 1, wherein the first bitrate is the same as the third bitrate.

6. The method of claim 1, wherein the request for the one or more advertisements at the first bit rate is in response to a request for the content from the user device.

7. The method of claim 1, wherein the at least one of the first plurality of advertising fragments is an advertising fragment displayed based on the selection of the second bitrate.

8. The method of claim 1, wherein the second manifest file further comprises a reference to additional advertising fragments of one or more additional advertisements.

9. A method comprising:
   transmitting, by a user device, a first request for content to a first manifest server, wherein the first request for the content comprises a selection of a first bitrate and an identifier;
   receiving, from the first manifest server, a first manifest file associated with a first data stream comprising the content at the first bitrate and a plurality of advertisements at the first bitrate;
   presenting, based on the first manifest file, the first data stream on a display device;
   transmitting a second request for the content while an advertisement of the plurality of advertisements is displayed on the display device, wherein the second request for the content is received by a second manifest server, and wherein the second request for the content comprises the identifier and a selection of a second bitrate;
   receiving, from the second manifest server, a second manifest file associated with a second data stream comprising the content at the second bitrate and the plurality of advertisements, wherein the second manifest file is based on state information stored separately from the first manifest file and the second manifest file; and
   transitioning, based on the second manifest tile, from presenting the first data stream to presenting the second data stream while the advertisement is displayed on the display device.

10. The method of claim 9, further comprising presenting the advertisement at the first bitrate after transitioning from presenting the first data stream to presenting the second data stream.

11. The method of claim 9, further comprising presenting the advertisement at the second bitrate after transitioning from presenting the first data stream to presenting the second data stream.

12. The method of claim 9, further comprising presenting the advertisement at a third bitrate after transitioning from presenting the first data stream to presenting the second data stream.

13. The method of claim 9, wherein the transitioning from presenting the first data stream to presenting the second data stream while the advertisement is displayed on the display device further comprises:
   determining a time point of the advertisement displayed at the moment of the transition; and
   presenting, after the transition, the advertisement starting at the time point.

14. The method of claim 9, wherein the first data stream comprises an Internet Protocol (IP) stream.

15. The method of claim 9, wherein the state information comprises one or more of an identifier associated with the user device, an identifier associated with the content or an attribute of the content.

16. A method comprising:

receiving, by a first manifest server, an identifier of a user device and an identifier associated with content at a first bitrate;

generating a first manifest file and state information, wherein the first manifest file comprises the identifier associated with the user device, a reference to the content at the first bitrate, and a plurality of references to a plurality of advertisements at the first bitrate, wherein the state information is stored separately from the first manifest file;

transmitting the first manifest file to the user device;

transmitting the identifier associated with the user device and the state information to a second manifest server;

receiving, by the second manifest server, the identifier associated with the user device and an identifier associated with the content at a second bitrate;

identifying, based on the identifier associated with the user device and the state information, the plurality of advertisements at the second bitrate;

generating a second manifest file wherein the second manifest file comprises the identifier associated with the user device, a reference to the content at the second bitrate, and a plurality of references to the plurality of advertisements at the second bitrate; and transmitting the second manifest file to the user device.

17. The method of claim 16, wherein the second manifest file comprises a plurality of references to additional advertisements, wherein the additional advertisements are associated with the state information.

18. The method of claim 16, wherein the state information comprises one or more of the identifier associated with the user device, the identifier associated with the content, an attribute of the content, and the method further comprises, updating the state information based on the second manifest file.

19. The method of claim 16, wherein the second manifest file further comprises references to the plurality of advertisements at a third bitrate.

20. The method of claim 18 further comprising transmitting the updated state information and the identifier associated with the user device to the first manifest server.

* * * * *